(12) United States Patent
Ki et al.

(10) Patent No.: US 11,713,378 B2
(45) Date of Patent: Aug. 1, 2023

(54) POLYMER FILM AND PREPARATION METHOD THEREOF

(71) Applicant: SK microworks Co., Ltd., Gyeonggi-do (KR)

(72) Inventors: Jung Hee Ki, Gyeonggi-do (KR); Sunhwan Kim, Incheon (KR); Dae Seong Oh, Seoul (KR); Jin Woo Lee, Seoul (KR); Sang Hun Choi, Seoul (KR); Han Jun Kim, Gyeonggi-do (KR); Heung Sik Kim, Seoul (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 392 days.

(21) Appl. No.: 16/912,908

(22) Filed: Jun. 26, 2020

(65) Prior Publication Data

US 2020/0407519 A1  Dec. 31, 2020

(30) Foreign Application Priority Data

Jun. 28, 2019 (KR) .................. 10-2019-0078286
Feb. 27, 2020 (KR) .................. 10-2020-0024447

(51) Int. Cl.
*C08J 5/18* (2006.01)

(52) U.S. Cl.
CPC ............. *C08J 5/18* (2013.01); *C08J 2377/00* (2013.01); *C08J 2379/08* (2013.01)

(58) Field of Classification Search
CPC ................................ C08J 5/18; C08J 2379/08
See application file for complete search history.

(56) References Cited

U.S. PATENT DOCUMENTS

2019/0375894 A1  12/2019 Sakayori et al.
2020/0157283 A1*  5/2020 Yu .................. C08G 73/10

FOREIGN PATENT DOCUMENTS

| CN | 109843989 A | 6/2019 |
| KR | 10-2007-0059114 A | 6/2007 |
| KR | 10-2018-0092300 A | 8/2018 |
| KR | WO 2019/139258 A1 * | 7/2019 |

OTHER PUBLICATIONS

Office Action for the Chinese Patent Application No. 202010611641.6 issued by the Chinese Patent Office dated Oct. 25, 2022.

* cited by examiner

*Primary Examiner* — Ana L. Woodward
(74) *Attorney, Agent, or Firm* — IP & T Group LLP

(57) ABSTRACT

The polymer film according to an embodiment comprises at least one polymer resin selected from the group consisting of a polyamide-based resin, a polyimide-based resin, and a polyamide-imide-based resin, and has a haze of 0.6% or less and an in-plane retardation within a specific range for each wavelength band in the visible light region.

The polymer film, which has an in-plane retardation within a specific range for each wavelength band in the visible light region, is excellent in transparency and optical properties, and it can remarkably reduce the rainbow phenomenon and improve the reflection appearance.

10 Claims, 5 Drawing Sheets

POLYMER FILM AND PREPARATION METHOD THEREOF

The present application claims priority of Korean patent application numbers 10-2019-0078286 filed on Jun. 28, 2019 and 10-2020-0024447 filed on Feb. 27, 2020. The disclosure: of each of the foregoing applications is incorporated herein by reference in its entirety.

TECHNICAL FIELD

Embodiments relate to a polymer film, a process for preparing the same, and a front panel and a display device comprising the same.

BACKGROUND ART OF THE INVENTION

Polyimide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like.

Since liquid crystal displays consume less power, have a smaller volume, and are lighter than cathode-ray tubes, they are widely used in televisions and various monitors. In order to improve the viewing angle and contrast ratio, a retardation film that compensates for the optical anisotropy of liquid crystal cells may be employed in a liquid crystal display.

However, since a polyimide-based resin is colored in brown and yellow due to its high aromatic ring density, which lowers the transmittance in the visible region and increases the birefringence, it is difficult for the resin to be used for a retardation film that compensates for optical anisotropy.

In addition, if a polyimide-based resin is applied to a retardation film or a film for a display, a phenomenon called "rainbow phenomenon" may occur. As the display on the opposite side is blackened to improve contrast, such a rainbow phenomenon tends to be more easily observed with the naked eyes. In addition, the rainbow phenomenon may cause many problems such as a distortion of colors due to overlapping interference on the screen to be displayed or a failure to display a desired image.

Thus, there has been a continuous demand for research on the development of a film that has excellent wavelength dispersion in the visible region, excellent reflection appearance by technically suppressing the rainbow phenomenon, and enhanced transparency and mechanical properties.

DISCLOSURE OF THE INVENTION

Problem to be Solved

Embodiments aim to provide a polymer film that is excellent in optical properties such as transparency, has an in-plane retardation within a specific range for each wavelength band in the visible light region, which is effective in preventing reflection in a wide viewing angle, and can significantly reduce the rainbow phenomenon, a process for preparing the same, and a front panel and a display device comprising the same.

Solution to the Problem

The polymer film according to an embodiment comprises at least one polymer resin selected from the group consisting of a polyamide-based resin, a polyimide-based resin, and a polyamide-imide-based resin, wherein the polymer film has a haze of 0.6% or less and an in-plane retardation deviation ratio (A) represented by the following Equation 1 of −0.5 or more, and R1 in the following Equation 1 is 1,000 nm or less.

$$A=(R2-R1)/(\lambda 2-\lambda 1) \qquad \text{[Equation 1]}$$

Here, $\lambda 1$ is 400 nm, $\lambda 2$ is 800 nm, R1 is the in-plane retardation of the polymer film measured with light having a wavelength of $\lambda 1$, and R2 is the in-plane retardation of the polymer film measured with light having a wavelength of $\lambda 2$.

The polymer film according to another embodiment comprises at least one polymer resin selected from the group consisting of a polyamide-based resin, a polyimide-based resin, and a polyamide-imide-based resin, wherein Ra represented by the following Equation 5 is 1.0 to 1.4, and Rb represented by the following Equation 6 is 0.7 to 1.0.

$$Ra=R_{450}/R_{550} \qquad \text{[Equation 5]}$$

$$Rb=R_{650}/R_{550} \qquad \text{[Equation 6]}$$

Here, $R_{450}$, $R_{550}$, and $R_{650}$ are the in-plane retardations of the polymer film measured with light having a wavelength of 450 nm, 550, nm and 650 nm, respectively.

The front panel for a display according to another embodiment comprises a polymer film and a functional layer, wherein the polymer film comprises at least one polymer resin selected from the group consisting of a polyamide-based resin, polyimide-based resin, and a polyamide-imide-based resin, the polymer film has a haze of 0.6% or less and an in-plane retardation deviation ratio (A) represented by the following Equation 1 of −0.5 or more, and R1 in the following Equation 1 is 1,000 nm or less.

$$A=(R2-R1)/(\lambda 2-\lambda 1) \qquad \text{[Equation 1]}$$

Here, $\lambda 1$ is 400 nm, $\lambda 2$ is 800 nm, R1 is the in-plane retardation of the polymer film measured with light having a wavelength of $\lambda 1$, and R2 is the in-plane retardation of the polymer film measured with light having a wavelength of $\lambda 2$.

The process for preparing the polymer film according to an embodiment comprises forming an unstretched sheet from at least one polymer resin selected from the group consisting of a polyamide-based resin, a polyimide-based resin, and a polyamide-imide-based resin; stretching the unstretched sheet at a stretching ratio of 1.01 to 1.5 in the MD direction or the TD direction; and heat setting the stretched sheet.

Advantageous Effects of the Invention

The polymer film according to an embodiment comprises at least one polymer resin selected from the group consisting of a polyamide-based resin, a polyimide-based resin, and a polyamide-imide-based resin, and has a haze of 0.6% or less and an in-plane retardation within a specific range for each wavelength band in the visible light region. Thus, it can remarkably reduce the rainbow phenomenon and improve the reflection appearance.

Further, the polymer film according to an embodiment exhibits an aesthetic feeling similar to that of glass and can minimize the optical distortion and color distortion when applied to a display device.

DETAILED DESCRIPTION FOR CARRYING OUT THE INVENTION

Figure 1:
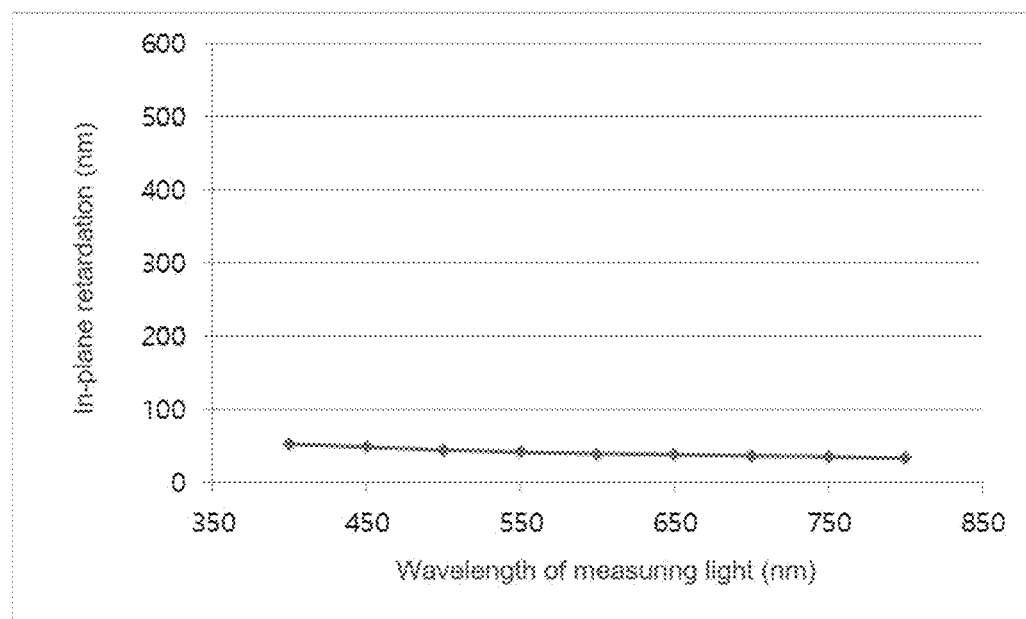
FIG. 1 is a graph showing the in-plane retardation (Ro, nm) of the film prepared in Example 1 measured by light having each wavelength band (nm).
Figure 2:
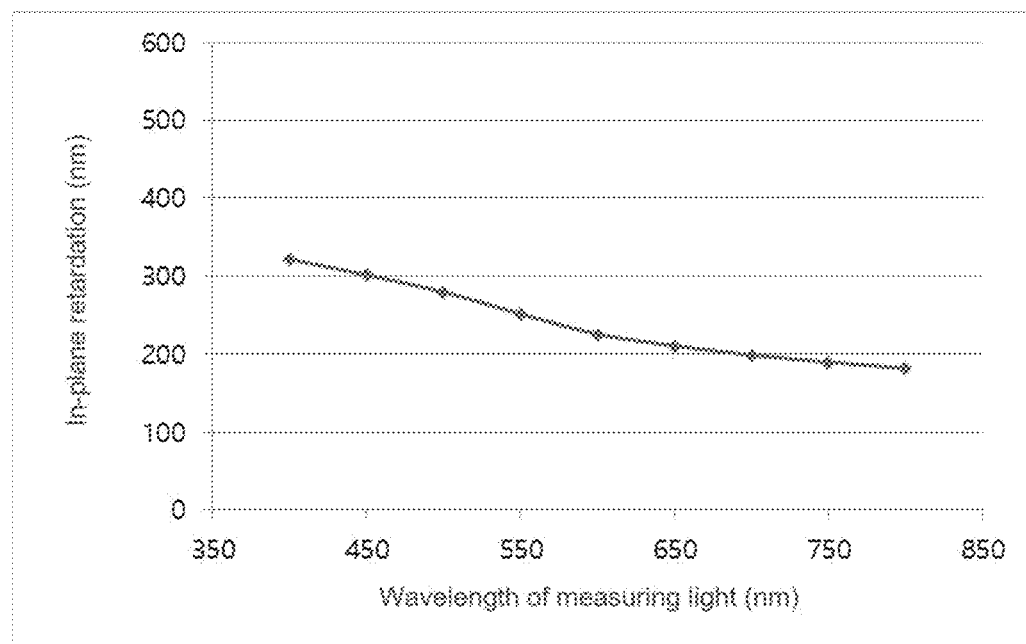
FIG. 2 is a graph showing the in-plane retardation (Ro, nm) of the film prepared in Example 2 measured by light having each wavelength band (nm).
Figure 3:
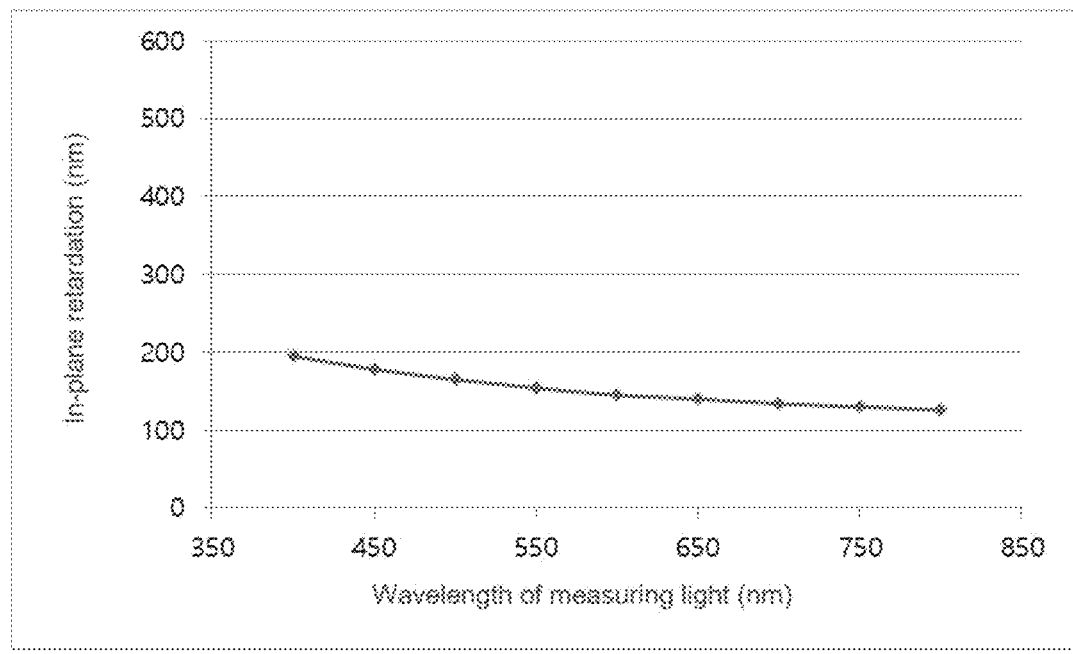
FIG. 3 is a graph showing the in-plane retardation (Ro, nm) of the film prepared in Example 3 measured by light having each wavelength band (nm).
Figure 4:
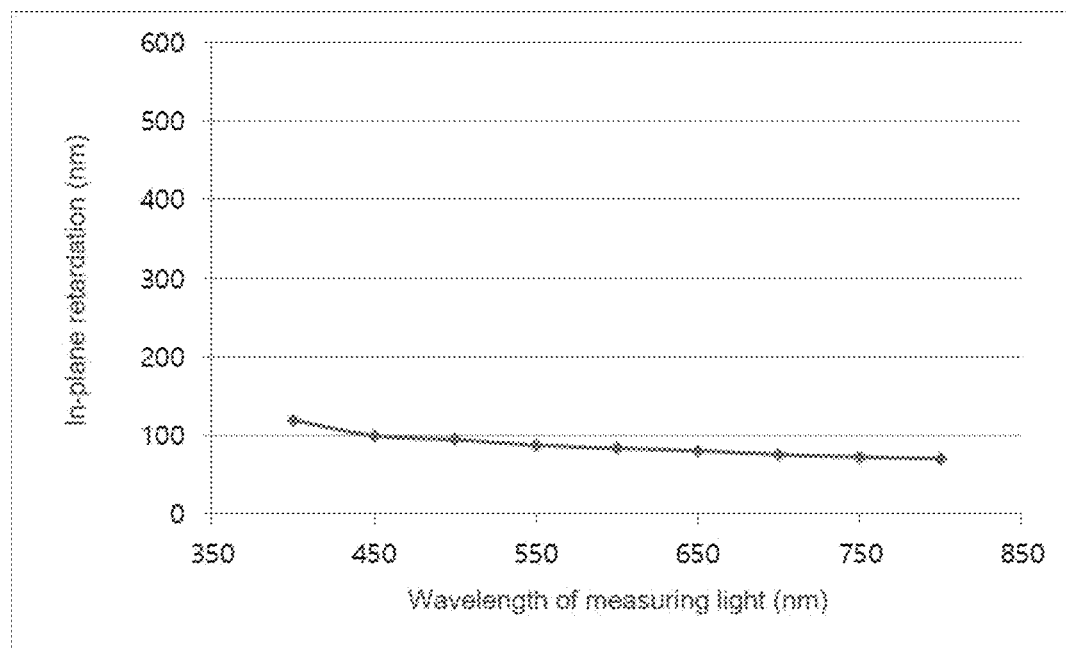
FIG. 4 is a graph showing the in-plane retardation (Ro, nm) of the film prepared in Example 4 measured by light having each wavelength band (nm).
Figure 5:
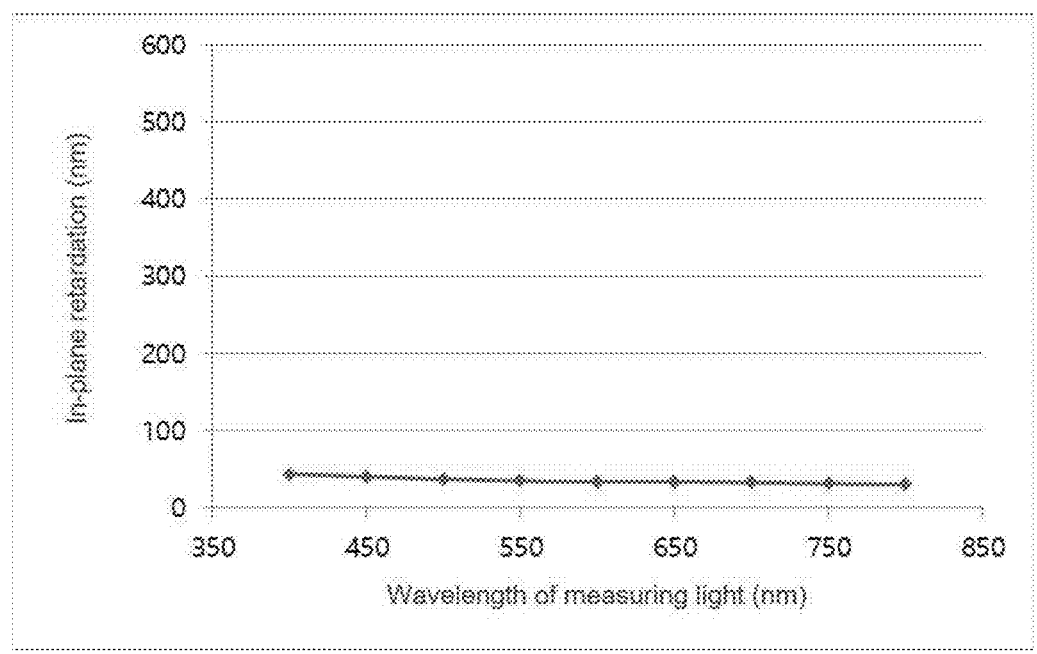
FIG. 5 is a graph showing the in-plane retardation (Ro, nm) of the film prepared in Example 5 measured by light having each wavelength band (nm).
Figure 6:
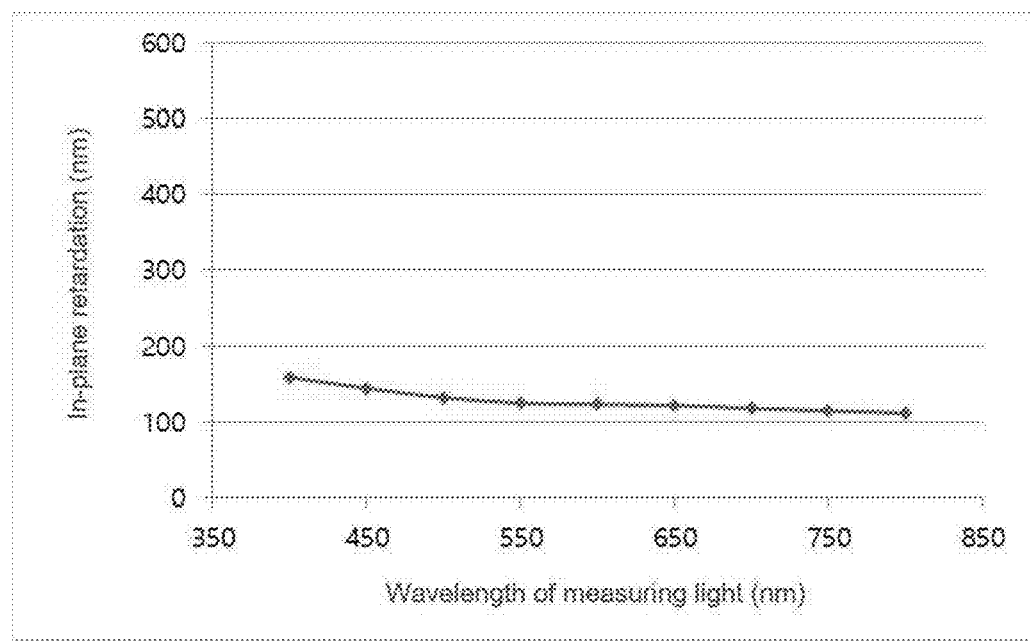
FIG. 6 is a graph showing the in-plane retardation (Ro, nm) of the film prepared in Example 6 measured by light having each wavelength band (nm).
Figure 7:
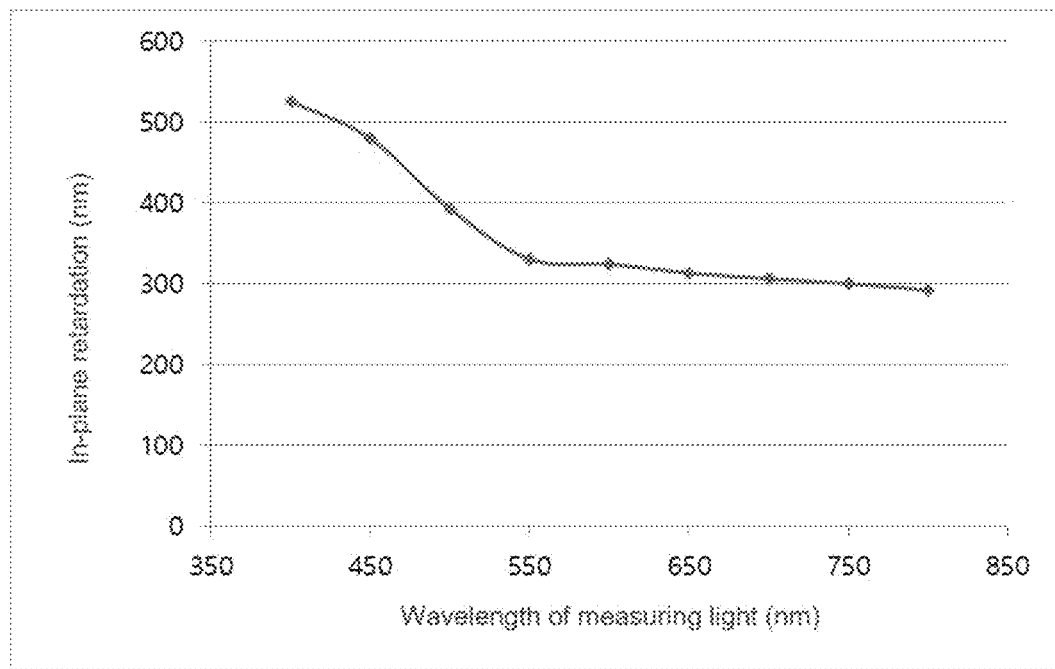
FIG. 7 is a graph showing the in-plane retardation (Ro, nm) of the film prepared in Comparative Example 1 measured by light having each wavelength band (nm).
Figure 8:
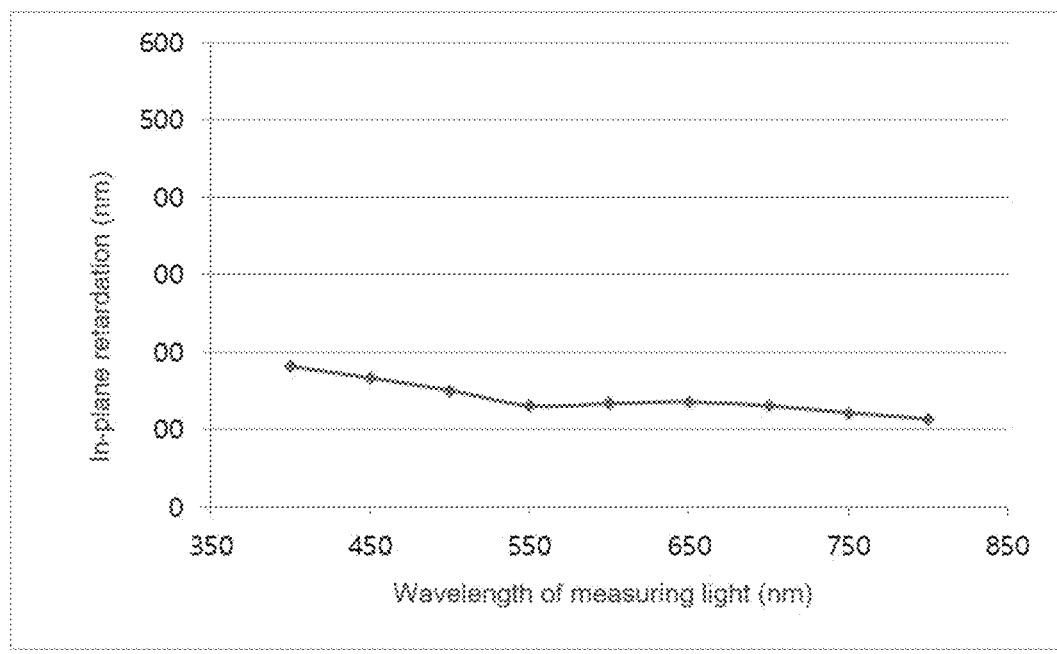
FIG. 8 is a graph showing the in-plane retardation (Ro, nm) of the film prepared in Comparative Example 2 measured by light having each wavelength band (nm).
Figure 9:
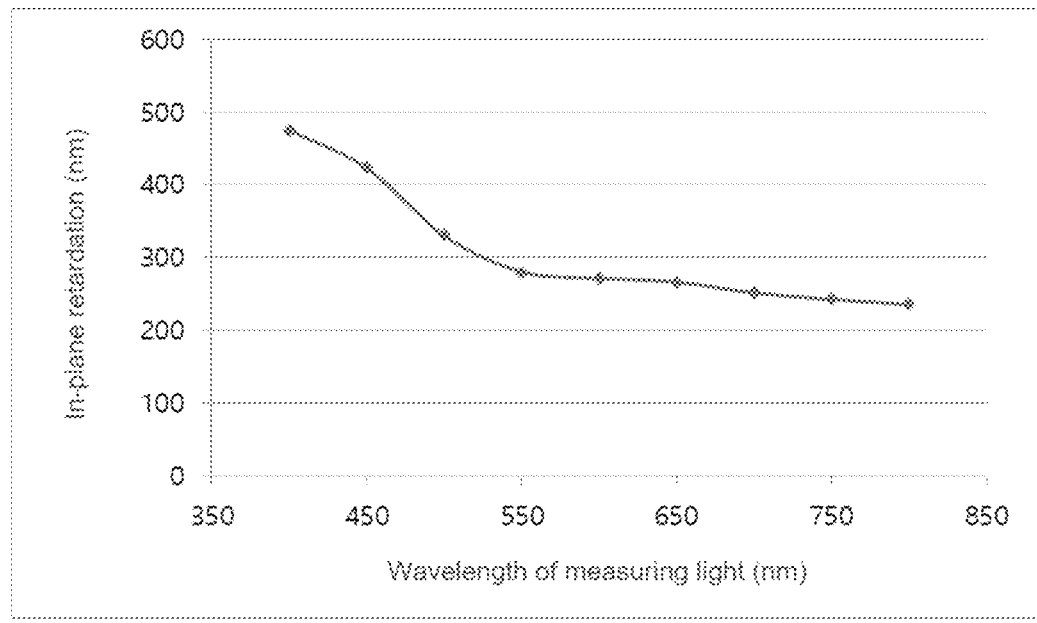
FIG. 9 is a graph showing the in-plane retardation (Ro, nm) of the film prepared in Comparative Example 3 measured by light having each wavelength band (nm).

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polymer Film

An embodiment provides a polymer film that is excellent in optical properties, significantly reduces the rainbow phenomenon, and exhibits an aesthetic feeling similar to that of glass.

The polymer film according to an embodiment comprises at least one polymer resin selected from the group consisting of a polyamide-based resin, a polyimide-based resin, and a polyamide-imide-based resin, and which has an in-plane retardation deviation ratio (A) represented by the following Equation 1 of −0.5 or more.

$$A = (R2 - R1)/(\lambda 2 - \lambda 1) \qquad \text{[Equation 1]}$$

Here, $\lambda 1$ and $\lambda 2$ are the wavelengths of light used for measuring the in-plane retardation of the polymer film. R1 is the in-plane retardation of the polymer film measured with light having a wavelength of $\lambda 1$, and R2 is the in-plane retardation of the polymer film measured with light having a wavelength of $\lambda 2$.

$\lambda 1$ may be about 400 nm, and $\lambda 2$ may be about 800 nm.

$\lambda 1$ may be selected from the blue wavelength band, and $\lambda 2$ may be selected from the red wavelength band.

For example, $\lambda 1$ may be selected from about 350 nm to about 450 nm, and $\lambda 2$ may be selected from about 750 nm to about 850 nm.

$\lambda 1$ may be about 400 nm, and $\lambda 2$ may be about 550 nm.

$\lambda 1$ may be selected from the blue wavelength band, and $\lambda 2$ may be selected from the green wavelength band.

$\lambda 1$ may be selected from about 350 nm to about 450 nm, and $\lambda 2$ may be selected from about 500 nm to about 600 nm.

$\lambda 1$ may be about 550 nm, and $\lambda 2$ may be about 800 nm.

$\lambda 1$ may be selected from the green wavelength band, and $\lambda 2$ may be selected from the red wavelength band.

$\lambda 1$ may be selected from about 500 nm to about 600 nm, and $\lambda 2$ may be selected from about 750 nm to about 850 nm.

$\lambda 1$ may be selected from the visible light wavelength band, $\lambda 2$ may be selected from the visible light wavelength band, and the difference between $\lambda 1$ and $\lambda 2$ may be 100 nm or more.

$\lambda 1$ and $\lambda 2$ are each selected from the group consisting of about 400 nm, about 450 nm, about 500 nm, about 550 nm, about 650 nm, about 700 nm, about 750 nm, and about 800 nm, and λ1 may be smaller than λ2.

In the polymer film, the in-plane retardation deviation ratio (A) may be about −0.5 or more. In the polymer film, the in-plane retardation deviation ratio (A) may be about −0.4 or more. In the polymer film, the in-plane retardation deviation ratio (A) may be about −0.38 or more. In the polymer film, the in-plane retardation deviation ratio (A) may be less than 0. In the polymer film, the in-plane retardation deviation ratio (A) may be less than −0.01.

Here, when λ1 and λ2 are selected from the above conditions, the in-plane retardation deviation ratio (A) may satisfy at least one of the above ranges.

When λ1 is about 400 nm, R1 may be about 1,000 nm or less. In addition, when λ2 is about 800 nm, R2 may be about 1,000 nm or less. When λ1 is about 400 nm, R1 may be about 500 nm or less. In addition, when λ2 is about 800 nm, R2 may be about 500 nm or less. When λ1 is about 400 nm, R1 may be about 400 nm or less, and when λ2 is about 800 nm, R2 may be about 300 nm or less. When λ1 is about 400 nm, R1 may be about 350 nm or less, and when λ2 is about 800 nm, R2 may be about 200 nm or less. When λ1 is about 400 nm, R1 may be about 350 nm or less, and when λ2 is about 800 nm, R2 may be about 200 nm or less.

For example, A may be −0.4 or more, R1 may be 400 nm or less, and R2 may be 300 nm or less.

When λ1 is smaller than λ2, R1 may be larger than R2. When 1 is about 400 nm and λ2 is about 800 nm, R1 may be larger than R2. When λ1 is about 400 nm and λ2 is about 800 nm, R1 may be larger than R2 by about 10 nm to about 150 nm.

The polymer film may have an in-plane retardation deviation gap (G) represented by the following Equation 2 of 100 nm or less.

$$G=|R3-\{R1+A(\lambda 3-\lambda 1))\}|$$ [Equation 2]

Here, λ1 is about 400 nm, A is the value derived when λ2 is about 800 nm, λ3 is about 550 nm, and R3 is the in-plane retardation of the polymer film measured with light having a wavelength of 3.

The in-plane retardation deviation gap (G) is about 90 nm or less. The in-plane retardation deviation gap (G) may be about 80 nm or less. The in-plane retardation deviation gap (G) may be 60 nm or less. The in-plane retardation deviation gap (G) may be about 50 nm or less, 40 nm or less, 30 nm or less, or 20 nm or less.

The polymer film shows a feature that the in-plane retardation decreases as the wavelength of the measuring light increases from 400 nm to 800 nm. It is possible to achieve a display device having excellent reflection appearance since the transparency and glossiness can be improved and the rainbow phenomenon can be remarkably reduced by adjusting the in-plane retardation deviation ratio (A).

The rainbow phenomenon refers to a stain caused by the interference of light generated by light reflection. If the difference in refractive index is large, it may occur because the difference in reflectance for each wavelength of light is large. This rainbow phenomenon impairs visibility and causes eye fatigue. Thus, the rainbow phenomenon can be suppressed by controlling the wavelength dispersion by adjusting the rate of change in the in-plane retardation for each wavelength band.

Since the polymer film has a low in-plane retardation deviation ratio, the deviation in in-plane retardation for each wavelength band of incident light may be small. For example, the polymer film may have a small difference between the in-plane retardation in red light and the in-plane retardation in blue light. Thus, since the polymer film has a small difference in the in-plane retardation according to the color of light, the color distortion can be reduced.

In addition, the polymer film has an in-plane retardation deviation gap (G) within the above range. Thus, R3 may have a proper value between R1 where λ1 is about 400 nm and R2 where λ2 is about 800 nm. That is, R3 may be located in a portion close to a straight line between λ1 and λ2 in the graph of in-plane retardation (y-axis) with respect to wavelength (x-axis) of the measuring light. Thus, in the polymer film, the in-plane retardation deviation gap (G) is small, so that the graph of the in-plane retardation with respect to the wavelength band of the light becomes close to a straight line.

Thus, when the in-plane retardation deviation gap (G) is within the above range, the polymer film may further reduce the color distortion and have enhanced optical properties.

The polymer film according to an embodiment has a haze of 0.6% or less.

If the haze of the polymer film exceeds the above range, the transparency is deteriorated, making it unsuitable for application to a front panel or a display device. In addition, since the screen appears bluish and dark, there arises a problem that more power is consumed to maintain a brighter screen to compensate for this.

The polymer film according to an embodiment has a glossiness of 90 GU to 120 GU.

Specifically, the polymer film may have a glossiness of 92 GU to 115 GU, but it is not limited thereto.

If the glossiness of the polymer film is within the above range, it has gloss characteristics similar to those of glass, so that it can realize an aesthetic feeling similar to that of glass. In addition, as compared with the conventional films, it produces the effect of enhanced visibility of a display and secures lightweight as compared with glass.

In particular, the glossiness value corresponds to a glossiness value of the polymer film at 60°. Since this angle is an angle generally recognized by the human eye, this property is of more significance.

The polymer film according to an embodiment has a refractive index of 1.6 to 1.7.

The refractive index refers to an average value of nx, ny, and nz at a wavelength of 550 nm. Here, nx is a refractive index in one stretching direction of the polymer film. ny is a refractive index in a direction perpendicular to the stretching direction of the polymer film. nz is a refractive index in the thickness direction of the polymer film.

Specifically, the refractive index of the polymer film may be 1.62 to 1.68 or 1.63 to 1.67, but it is not limited thereto.

If the refractive index of the polymer film is within the above range, the optical distortion and color distortion can be minimized when the film is applied to a display device.

The polymer film according to an embodiment may have an in-plane retardation (R) at a wavelength of 550 nm of 1 nm to 1,000 nm, specifically 1 nm to 800 nm, 1 nm to 500 nm, or 1 nm to 400 nm.

The polymer film according to an embodiment may have a thickness direction retardation (Rth) at a wavelength of 550 nm of 500 nm to 6,000 nm, specifically 1,000 nm to 5,500 nm or 1,500 nm to 5,000 nm.

The in-plane retardation (R) may be calculated by the following Equation 3.

$$R=|ny-nx|\times d$$ [Equation 3]

Here, d is the thickness of the polymer film.

The thickness direction retardation (Rth) may be calculated by the following Equation 4.

$$Rth=\{(nx+ny)/2-nz\}\times d \quad \text{[Equation 4]}$$

The polymer film according to an embodiment may have an Ra value represented by the following Equation 5 of 1.0 to 1.4 and an Rb value represented by the following Equation 6 of 0.7 to 1.0.

$$Ra=R_{450}/R_{550} \quad \text{[Equation 5]}$$

$$Rb=R_{650}/R_{550} \quad \text{[Equation 6]}$$

Here, $R_{450}$, $R_{550}$, and $R_{650}$ are the in-plane retardations of the polymer film measured with light having a wavelength of 450 nm, 550 nm, and 650 nm, respectively.

If the Ra value is less than 1.0, there may arise a problem that a rainbow phenomenon of a blue-based color occurs. If it exceeds 1.4, there may arise a problem that a rainbow phenomenon of a red-based color occurs. In addition, if the Rb value is outside the above range, there may arise a problem that a rainbow phenomenon occurs.

Specifically, the polymer film may have an Ra value represented by the above Equation 5 of 1.0 to 1.3, 1.0 to 1.28, 1.1 to 1.3, or 1.1 to 1.28, but it is not limited thereto.

In addition, the polymer film may have an Rb value represented by the above Equation 6 of 0.8 to 1.0, but it is not limited thereto.

The polymer film according to another embodiment has a wavelength dispersion constant (Rs) represented by the following Equation 7 of 0.8 to 1.3.

$$Rs=Ra\times Rb \quad \text{[Equation 7]}$$

Here, Ra is R450/R550, Rb is $R_{650}/R_{550}$, and $R_{450}$, $R_{550}$, and $R_{650}$ are the in-plane retardations of the polymer film measured with light having a wavelength of 450 nm, 550 nm, and 650 nm, respectively.

Specifically, the polymer film may have an Rs value represented by the above Equation 7 of 0.9 to 1.3, 0.95 to 1.3, or 1.0 to 1.3, but it is not limited thereto.

The polymer film according to an embodiment comprises at least one polymer resin selected from the group consisting of a polyamide-based resin, a polyimide-based resin, and a polyamide-imide-based resin, wherein the polymer film comprises the polymer resin in an amount of 90% by weight or more based on the total weight of the polymer film.

The polyamide-based resin is a resin that contains an amide repeat unit. The polyimide-based resin is a resin that contains an imide repeat unit. In addition, the polyamide-imide-based resin is a resin that contains an amide repeat unit and an imide repeat unit.

The polyimide-based resin may further contain an amide repeat unit, and the polyamide-based resin may further contain an imide repeat unit.

Meanwhile, the polymer resin contained in the polymer film may be prepared by simultaneously or sequentially reacting reactants that comprise a diamine compound and a dianhydride compound. Specifically, the polymer resin may comprise a polyimide-based resin prepared by polymerizing a diamine compound and a dianhydride compound.

In addition, the polymer resin may comprise a polyamide-imide-based resin that contains an imide repeat unit derived from the polymerization of a diamine compound and a dianhydride compound and an amide repeat unit derived from the polymerization of a diamine compound and a dicarbonyl compound.

Since the polyamide-imide-based resin contains an imide repeat unit, it may fall under a polyimide-based resin in a broad sense.

The polymer film according to an embodiment comprises a polymer resin, wherein the polymer resin is prepared by polymerizing a diamine compound, a dianhydride compound, and dicarbonyl compound, and the molar ratio of the dianhydride compound and the dicarbonyl compound may be 5:95 to 95:5, 5:95 to 90:10, 10:90 to 90:10, 10:90 to 80:20, 10:90 to 75:25, or 10:90 to 70:30, but it is not limited thereto.

If the molar ratio of the dianhydride compound and the dicarbonyl compound is within the above range, a film having excellent optical properties and mechanical properties can be obtained. For example, if the molar ratio of the dicarbonyl compound is relatively large, the mechanical strength such as modulus may be deteriorated.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

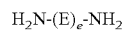

[Formula 1]

In Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

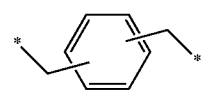

1-1a

1-2a

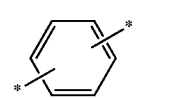

1-3a

1-4a

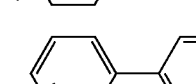

1-5a

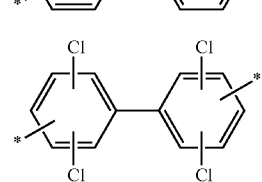

1-6a

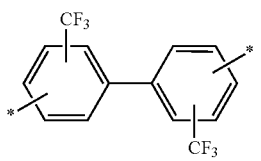
1-7a

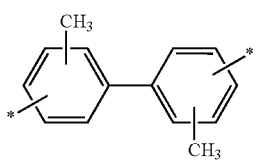
1-8a

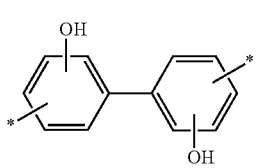
1-9a

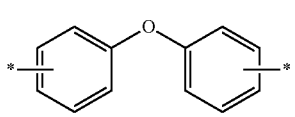
1-10a

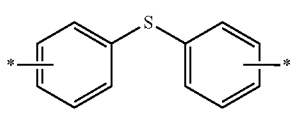
1-11a

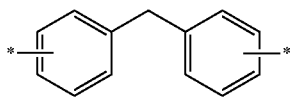
1-12a

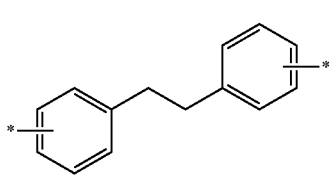
1-13a 1-14a
*—(CH$_2$)$_n$—*
(n is selected from integers of 1 to 12)

Specifically, (E)$_e$ in Formula 1 may be selected from the groups represented by the following Formulae 1-1b to 1-13b, but it is not limited thereto.

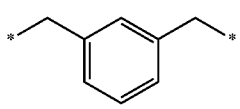
1-1b

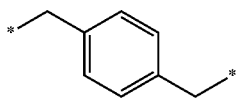
1-2b

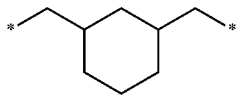
1-3b

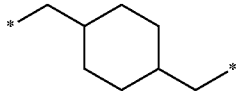
1-4b 1-5b
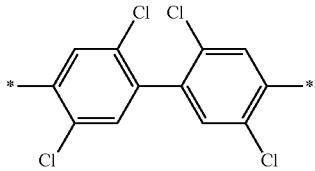

1-6b
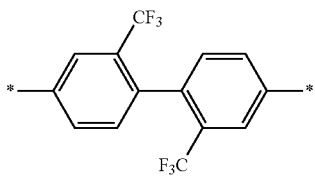

1-7b
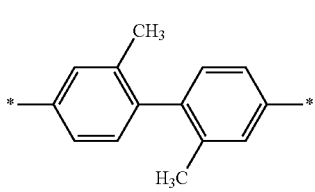

1-8b
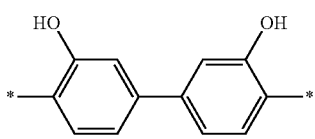

1-9b
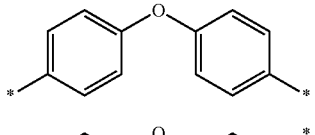

1-10b
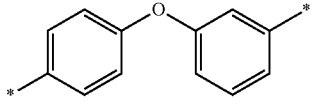

1-11b
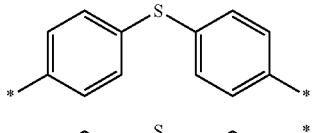

1-12b
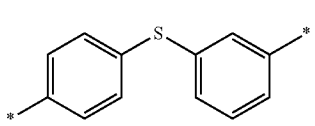

1-13b
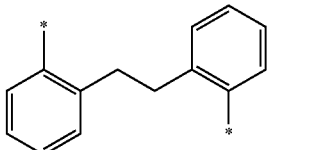

More specifically, (E)$_e$ in Formula 1 may be the group represented by the above Formula 1-6b or the group represented by the above Formula 1-9b.

In an embodiment, the dianhydride compound may comprise a compound having a fluorine-containing substituent. Alternatively, the dianhydride compound may be composed of a compound having a fluorine-containing substituent. In such event, the fluorine-containing substituent may be a fluorinated hydrocarbon group and specifically may be a trifluoromethyl group. But it is not limited thereto. If the content of fluorine contained in the polymer resin increases, the surface tension may increase.

In another embodiment, one kind of diamine compound or two kinds of diamine compound may be used as the diamine compound. Specifically, the diamine compound may be composed of a single component. For example, the diamine compound may comprise 2,2'-bis(trifluoromethyl) benzidine (TFMB/TFDB).

TFDB

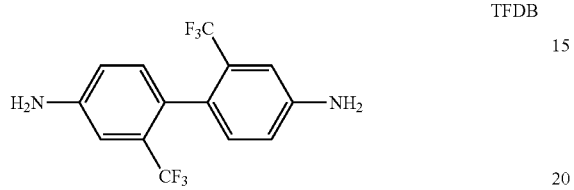

In addition, if the diamine compound comprises two kinds or more thereof, it may comprise 2,2'-bis(trifluoromethyl) benzidine having a fluorine-containing substituent as a first diamine compound and 4,4'-oxydianiline (ODA) as a second diamine compound.

The dianhydride compound has a low birefringence value, so that it can contribute to enhancements in the optical properties such as transmittance of a film that comprises the polyimide-based resin.

The dianhydride compound is not particularly limited, but it may be, for example, an aromatic dianhydride compound that contains an aromatic structure.

For example, the aromatic dianhydride compound may be a compound represented by the following Formula 2.

[Formula 2]

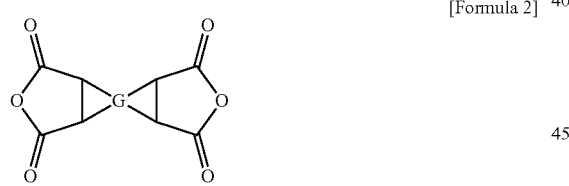

In Formula 2, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in Formula 2 may be selected from the groups represented by the following Formulae 2-1a to 2-9a and a cyclobutane group, but it is not limited thereto.

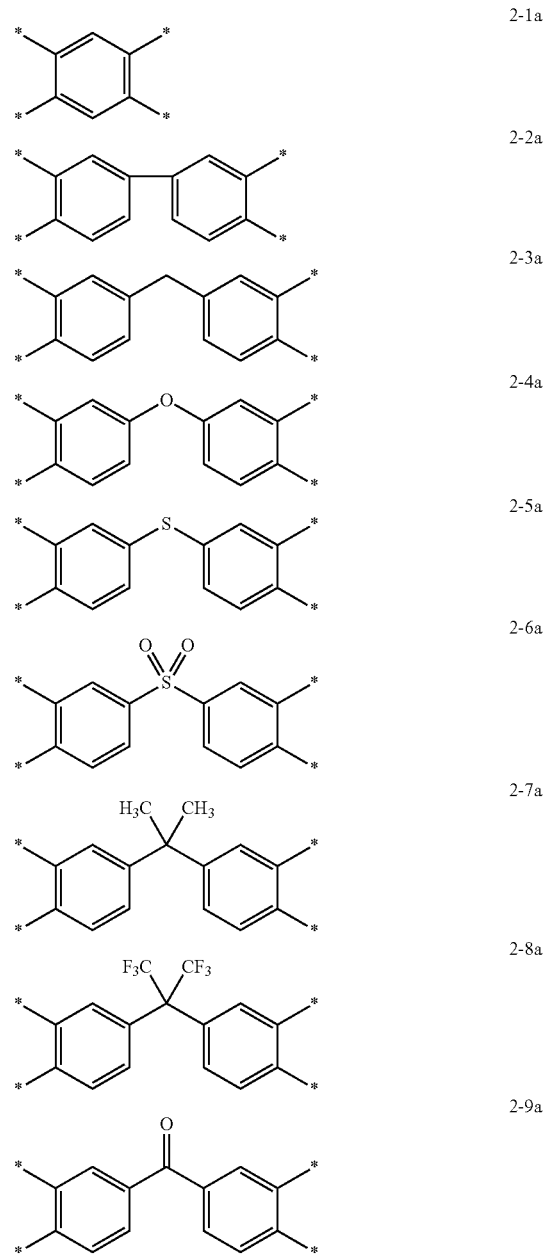

For example, G in Formula 2 may be the group represented by the above Formula 2-2a, the group represented by the above Formula 2-8a, the group represented by the above Formula 2-9a, or a cyclobutane group.

In an embodiment, the dianhydride compound may comprise a compound having a fluorine-containing substituent. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two or more components.

For example, the dianhydride compound may comprise at least one selected from the group consisting of 2,2'-bis-(3, 4-dicarboxyphenyl)hexafluoropropane dianhydride (6-FDA), 3,3',4,4'-biphenyltetracarboxylic dianhydride (BPDA), and cyclobutane-1,2,3,4-tetracarboxylic dianhydride (CBDA), which have the following structures.

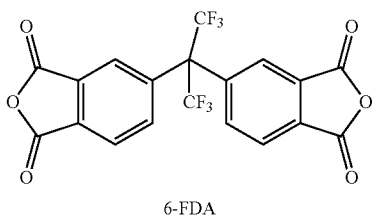
6-FDA

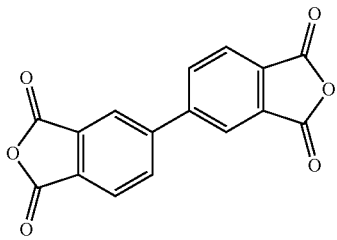
BPDA

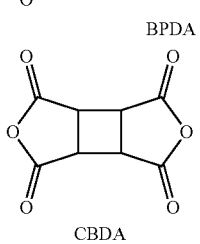
CBDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

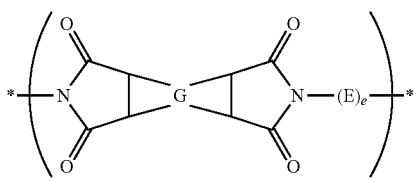
[Formula A]

In Formula A, E, G, and e are as described above.

For example, the polyimide may comprise a repeat unit represented by the following Formula A-1 but it is not limited thereto.

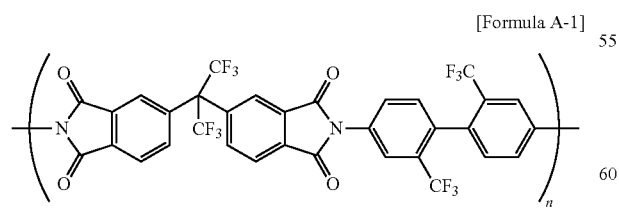
[Formula A-1]

In Formula A-1, n is an integer of 1 to 400.

The dicarbonyl compound is not particularly limited, but it may be, for example, a compound represented by the following Formula 3.

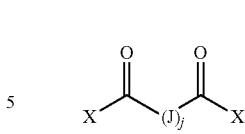
[Formula 3]

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be $C_1$, but it is not limited thereto.

(J)$_j$ in Formula 3 may be selected from the groups represented by the following Formulae 3-1a to 3-14a, but it is not limited thereto.

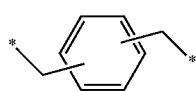
3-1a

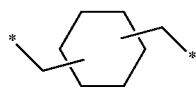
3-2a

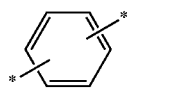
3-3a

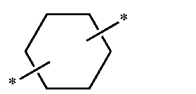
3-4a

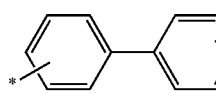
3-5a

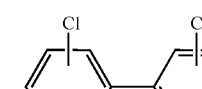
3-6a

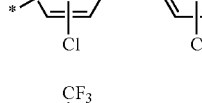
3-7a

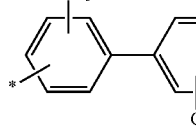

-continued

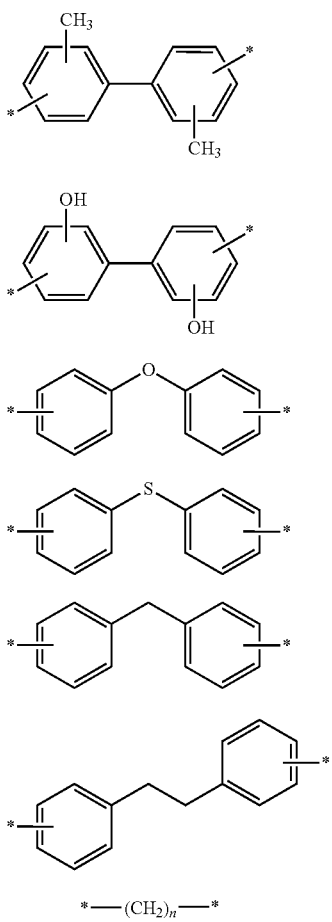

(n is selected from integers of 1 to 12)

Specifically, (J)$_j$ in Formula 3 may be selected from the groups represented by the following Formulae 3-1b to 3-8b, but it is not limited thereto.

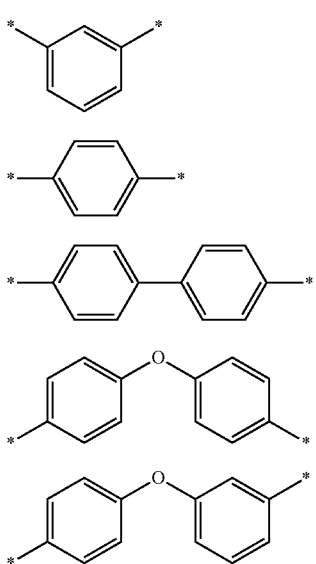

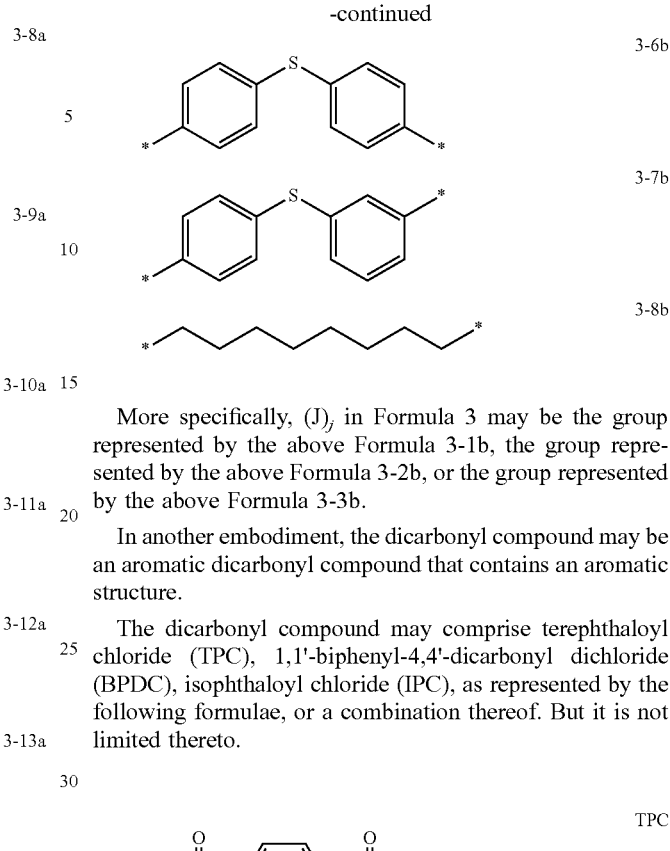

More specifically, (J)$_j$ in Formula 3 may be the group represented by the above Formula 3-1b, the group represented by the above Formula 3-2b, or the group represented by the above Formula 3-3b.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

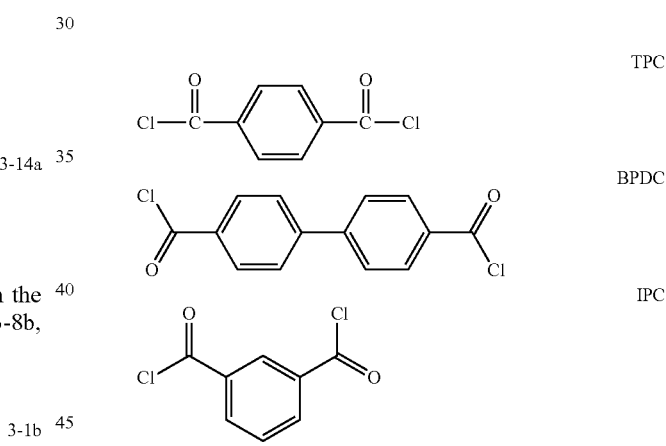

The diamine compound and the dicarbonyl compound may be polymerized to form a repeat unit represented by the following Formula B.

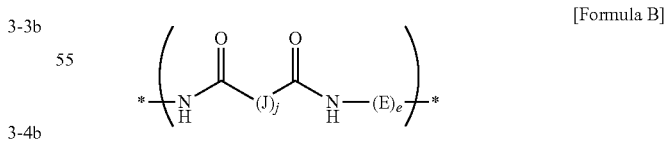

[Formula B]

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

[Formula B-1]

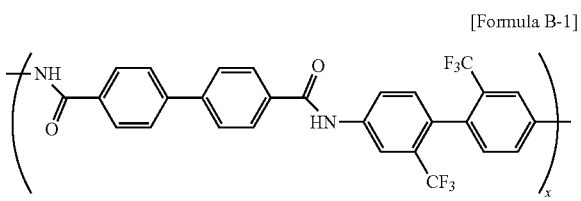

In Formula B-1, y is an integer of 1 to 400.

[Formula B-2]

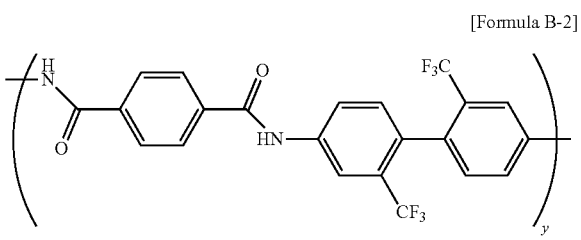

In Formula B-2, y is an integer of 1 to 400.

[Formula B-3]

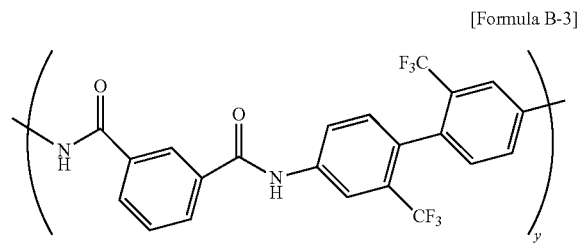

In Formula B-3, y is an integer of 1 to 400.

According to an embodiment, the polymer resin may comprise an imide repeat unit and an amide repeat unit at a molar ratio of 5:95 to 95:5, 5:95 to 90:10, 10:90 to 90:10, 10:90 to 80:20, 10:90 to 75:25, or 10:90 to 70:30, but it is not limited thereto.

If the molar ratio of the imide repeat unit and the amide repeat unit is within the above range, a film having excellent optical properties and mechanical properties can be obtained. On the other hand, if the molar ratio of the amide repeat unit exceeds the above range, the mechanical properties such as modulus may be deteriorated.

According to an embodiment, the polymer resin may comprise a repeat unit represented by the following Formula A and a repeat unit represented by the following Formula B:

[Formula A]

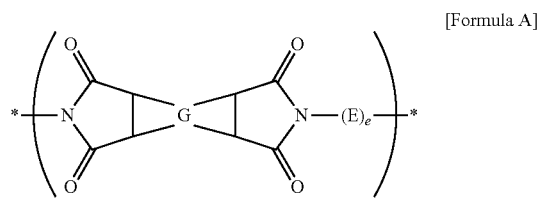

[Formula B]

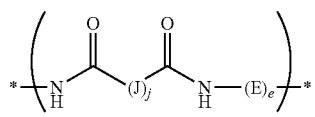

In Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, s when e is 2 or more, then the two or more Es are the same as, or different from, each other, when j is 2 or more, then the two or more Js are the same as, or different from, each other, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

The polymer resin may comprise the repeat unit represented by the following Formula A and the repeat unit represented by the following Formula B at a molar ratio of 5:95 to 95:5, 5:95 to 90:10, 10:90 to 90:10, 10:90 to 80:20, 10:90 to 75:25, or 10:90 to 70:30, but it is not limited thereto.

According to another embodiment, the polymer film may further comprise a filler.

The filler may be at least one selected from the group consisting of barium sulfate, silica, and calcium carbonate. As the polymer film comprises the filler, it is possible to enhance not only the surface roughness and winderability but also the effect of improving the scratches caused by sliding in the preparation of the film.

In addition, the filler may have a particle diameter of 0.01 μm to less than 1.0 μm. For example, the particle diameter of the filler may be 0.05 to 0.9 μm or 0.1 to 0.8 μm.

The polymer film may comprise the filler in an amount of 0.01 to 3% by weight. For example, the polymer film may comprise the filler in an amount of 0.05 to 2.5% by weight, 0.1 to 2% by weight, or 0.2 to 1.7% by weight.

If the content of the filler exceeds the above range, the haze of the film rapidly increases, and the filler may aggregate with each other on the surface of the film, so that a feeling of foreign matter may be visually observed. Such a film may appear to have improved antiblocking properties and winderability due to a low friction coefficient, but it may be unsuitable for application in a subsequent process due to such defects as scratches and wrinkles.

The polymer film may have a light transmittance at a wavelength of 550 nm of 80% or more. For example, the transmittance may be 85% or more, 88% or more, 89% or more, 80% to 99%, 85% to 99%, or 88% to 99%.

The polymer film has a yellow index of 3 or less. For example, the yellow index may be 2.8 or less or 2.5 or less, but it is not limited thereto.

The polymer film has a modulus of 5.0 GPa or more. Specifically, the modulus may be 5.5 GPa or more, 6.0 GPa or more, or 6.2 GPa or more, but it is not limited thereto.

The polymer film has a compressive strength is 0.3 kgf/μm or more. Specifically, the compressive strength may be 0.4 kgf/μm or more, 0.45 kgf/μm or more, or 0.48 kgf/μm or more, but it is not limited thereto.

When the polymer film is perforated at a rate of 10 mm/min using a 2.5-mm spherical tip in a UTM compression mode, the maximum diameter (mm) of perforation including a crack is 65 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polymer film has a surface hardness of HB or higher. Specifically, the surface hardness may be H or higher, or 2H or higher, but it is not limited thereto.

The polymer film has a tensile strength of 14 kgf/mm$^2$ or more. Specifically, the tensile strength may be 16 kgf/mm$^2$ or more, 18 kgf/mm$^2$ or more, 20 kgf/mm$^2$ or more, 21 kgf/mm$^2$ or more, or 22 kgf/mm$^2$ or more, but it is not limited thereto.

The polymer film has an elongation of 13% or more. Specifically, the elongation may be 15% or more, 16% or more, 17% or more, or 17.5% or more, but it is not limited thereto.

When the polymer film according to an embodiment is applied to a display material, an anti-reflection film, a compensation film, or a retardation film, the transparency is excellent, the rainbow phenomenon that may otherwise occur can be significantly reduced, and the optical properties may be enhanced. Further, it is possible to impart long-term stable mechanical properties to a substrate that requires flexibility in terms of modulus, elongation, tensile characteristics, and elastic restoring force.

The polymer film has a thickness of 30 μm to 100 μm. Specifically, the thickness of the polymer film may be 30 μm to 80 μm or 30 μm to 50 μm.

The features on the components and properties of the polymer film as described above may be combined with each other.

In addition, the properties of the polymer film as described above are the results materialized by combinations of the chemical and physical properties of the components, which constitute the polymer film, along with the conditions in each step of the process for preparing the polymer film as described below.

Front Panel

The front panel according to an embodiment comprises a polymer film and a functional layer.

The front panel may be a front panel for a display.

The polymer film comprises at least one polymer resin selected from the group consisting of a polyamide-based resin, a polyimide-based resin, and a polyamide-imide-based resin.

The details on the polymer film are as described above.

The front panel may be advantageously applied to a display device.

The functional layer is formed on the polymer film. The functional layer may comprise a curable resin and an inorganic filler. The functional layer may comprise a hard-coating layer for protecting the polymer film. The functional layer may comprise a refractive index matching layer for enhancing the transmittance.

The polymer film has an in-plane retardation within a specific range for each wavelength band in the range of 400 nm to 800 nm, which is effective in preventing reflection in a wide viewing angle, and it can realize an aesthetic feeling similar to that of glass. Thus, it may be advantageously applied to a front panel for a display. That is, since the front plate comprises the polymer film, it may have enhanced optical properties.

Display Device

The display device according to an embodiment comprises a display unit; and a front panel disposed on the display unit, wherein the front panel comprises a polymer film.

The polymer film comprises at least one polymer resin selected from the group consisting of a polyamide-based resin, a polyimide-based resin, and a polyamide-imide-based resin.

The details on the polymer film and the front panel are as described above.

Figure 10:
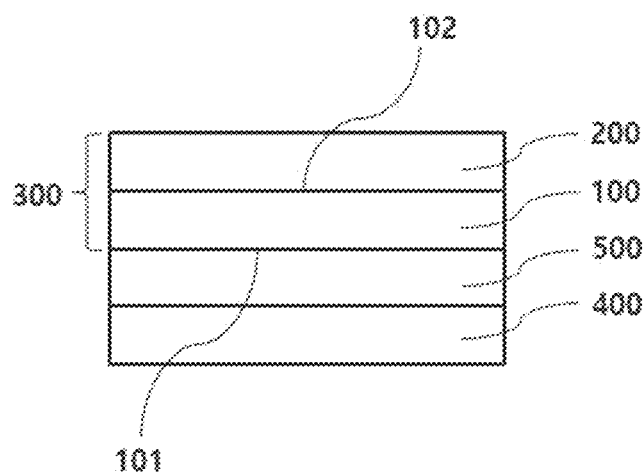
FIG. 10 is a cross-sectional view of a display device according to an embodiment.

FIG. 10 is a cross-sectional view of a display device according to an embodiment.

Specifically, FIG. 1 illustrates a display device, which comprises a display unit (400) and a front panel (300) disposed on the display unit (400), wherein the front panel comprises a polymer film (100) having a first side (101) and a second side (102) and a functional layer (200), and an adhesive layer (500) is interposed between the display unit (400) and the front panel (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the front panel (300). The adhesive layer may be an optically transparent adhesive layer, but it is not particularly limited.

The front panel (300) is disposed on the display unit (400). The front panel is located at the outermost position of the display device to thereby protect the display unit.

The front panel (300) may comprise a polymer film and a functional layer. The functional layer may be at least one selected from the group consisting of a hard coating, a reflectance reducing layer, an antifouling layer, and an antiglare layer. The functional layer may be coated on at least one side of the polymer film.

Since the display device comprises a front panel having enhanced optical performance, it is possible to implement a high-definition image.

Process for Preparing a Polymer Film

An embodiment provides a process for preparing a polymer film.

The process for preparing a polymer film according to an embodiment may comprise forming an unstretched sheet from at least one polymer resin selected from the group consisting of a polyamide-based resin, a polyimide-based resin, and a polyamide-imide-based resin; stretching the unstretched sheet at a stretching ratio of 1.01 to 1.5 in the MD direction or the TD direction; and heat setting the stretched sheet.

In the process for preparing a polymer film, the polymer resin may be prepared from a polymer solution prepared by simultaneously or sequentially mixing a diamine compound and a dianhydride compound, or a diamine compound, a dianhydride compound, and a dicarbonyl compound, in an organic solvent in a polymerization apparatus, and reacting the mixture.

The dianhydride compound, the dianhydride compound, or both may comprise a compound having a fluorine-containing substituent. The compound having a fluorine-containing substituent may be employed in an amount of 0.1% to 1% by weight, specifically 0.2% to 0.80% by weight, and more specifically 0.4% to 0.80% by weight, based on the total weight of the mixture.

The kinds of the diamine compound, the dianhydride compound, and the dicarbonyl compound are as described above.

In an embodiment, the polymer solution may be prepared by simultaneously mixing the diamine compound and the dianhydride compound, or simultaneously mixing the diamine compound, the dianhydride compound, and the dicarbonyl compound, in an organic solvent and reacting them.

In another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond at the same time. The polyamic acid solution is a solution that comprises a polyamic acid.

In still another embodiment, the step of preparing the polymer solution may comprise first mixing and reacting the diamine compound and the dianhydride compound to produce a polyamic acid (PAA) solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In still another embodiment, the step of preparing the polymer solution may comprise first mixing and reacting the diamine compound and the dicarbonyl compound to produce a polyamide (PA) solution; and second mixing and reacting the polyamide solution and the dianhydride compound to further form an imide bond. The polyamide solution is a solution that comprises a polymer having an amide repeat unit.

According to an embodiment of the present invention, the molar ratio of the diamine compound to the dianhydride compound may be 1:0.05 to 0.95, specifically 1:0.1 to 0.8.

In addition, the molar ratio of the diamine compound, the dianhydride compound, and the dicarbonyl compound may be 1:0.05 to 0.95:0.05 to 0.95, specifically 1:0.1 to 0.8:0.2 to 0.9. If the above ranges are satisfied, it has an in-plane retardation within a specific range for each wavelength band in the range of 400 nm to 800 nm as desired in the present invention, which is effective in preventing reflection in a wide viewing angle, which in turn remarkably reduces the rainbow phenomenon.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

Alternatively, the polymer contained in the polymer solution comprises an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 20% by weight. Alternatively, the content of solids contained in the polymer solution may be 12% by weight to 18% by weight, but it is not limited thereto.

If the content of solids contained in the polymer solution is within the above range, a polymer film can be effectively produced in the extrusion and casting steps. In addition, the polymer film thus prepared has a clean appearance and transparency, as well as an in-plane retardation within a specific range for each wavelength band in the range of in the visible light region, which is effective in preventing reflection in a wide viewing angle.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.4 molar equivalent based on 1 mole of the polyamic acid, but it is not limited thereto.

The further addition of the catalyst may expedite the reaction rate and enhance the chemical bonding force between the repeat unit structures or that within the repeat unit structures.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound, a dianhydride compound, and optionally a dicarbonyl compound in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dianhydride compound or the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7, but it is not limited thereto.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

In another embodiment, the step of preparing the polymer solution may further comprise purging with an inert gas. The step of purging with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

In the preparation of the polymer solution, the molar ratio of the dianhydride compound and the dicarbonyl compound may be 5:95 to 95:5, 5:95 to 90:10, 10:90 to 90:10, 10:90 to 80:20, 10:90 to 75:25, or 10:90 to 70:30, but it is not limited thereto.

If the dianhydride compound and the dicarbonyl compound are employed in the above molar ratio, it is advantageous for achieving the desired mechanical and optical properties of the polymer film prepared from the polymer solution.

The details on the diamine compound, the dianhydride compound, and the dicarbonyl compound are as described above.

The process for preparing a polymer film according to an embodiment may comprise coating the polymer solution comprising at least one polymer resin selected from the group consisting of a polyamide-based resin, a polyimide-based resin, and a polyamide-imide-based resin on a substrate to form an unstretched sheet.

The coating is not particularly limited, and any methods well known in the art may be used. For example, the coating of the polyimide-based composition may be carried out by a method such as microgravure coating, comma coating, bar coating, roller coating, spin coating, printing, dip coating, flexible film forming, die coating, blade coating, gravure printing, and the like.

The process for preparing a polymer film according to an embodiment may comprise stretching the unstretched sheet at a stretching ratio of 1.01 to 1.5 in the MD direction or the TD direction.

Specifically, the unstretched sheet may be stretched at a stretching ratio of 1.01 to 1.4, 1.01 to 1.3, 1.01 to 1.2, or 1.01 to 1.15 in the MD direction or the TD direction. If the stretching ratio is within the above range, it may be advantageous from the viewpoint of uniform thickness, appearance, and optical properties of the film. If the stretching ratio is outside the above range, an in-plane retardation at the desired level for each wavelength band in the range of 400 nm to 800 nm is not obtained. In particular, if it exceeds the above range, breakage may occur during the stretching.

The stretching is preferably carried out at a stretching temperature higher or lower than the glass transition temperature (Tg) of the polymer resin by 5° C. to 20° C. If the above range is satisfied, it may be more advantageous from the viewpoint of the process. Meanwhile, the glass transition temperature may be measured by a differential scanning calorimeter (DSC). For example, if a differential scanning calorimeter (DSC) is used, about 10 mg of a sample is sealed in a dedicated pan and heated at a specific rate to draw the heat absorption and heat generation of the material attributable to the phase change with respect to the temperature from which the glass transition temperature is measured. Alternatively, if a dynamic mechanical analyzer (DMA) is used, the elastic modulus is measured with respect to the temperature from which the glass transition temperature is measured.

The glass transition temperature of the polymer resin may be 300° C. to 380° C., specifically 310° C. C to 370° C., more specifically 315° C. to 365° C. Hence, the stretching may be carried out at a stretching temperature, which is higher or lower than the glass transition temperature (Tg) by 5° C. to 20° C., that is, in the range of 280° C. to 400° C., specifically 280° C. to 385° C. If the stretching temperature is lower than the reference temperature, there may arise a problem that breakage may occur during the stretching. If the stretching temperature exceeds it, there may arise a problem that breakage may occur or a film of uniform physical properties is hardly obtained.

According to an embodiment, whether the in-plane retardation (Ro) of the polymer film satisfies Equation 1 may hinge on the crystallization state of the polymer film in the MD direction or the TD direction. Thus, if the stretching conditions in the above ranges are satisfied, it may be advantageous for satisfying the in-plane retardation range of the film for each wavelength band as desired in the present invention.

Specifically, stretching in the MD (longitudinal) direction may be carried out at a speed of 0.5 to 20 m/min, and stretching in the TD (transverse) direction may be carried out at a speed of 0.5 to 20 m/min. More specifically, stretching in the MD direction may be carried out at a speed of 0.5 to 18 m/min, and stretching in the TD direction may be carried out at a speed of 0.5 to 15 m/min.

The process for preparing a polymer film according to an embodiment may comprise heat setting the stretched film.

The heat setting of the stretched film may be carried out at 250° C. to 450° C. Specifically, the stretched film may be heat set at 260° C. to 450° C. If the heat-setting temperature is within the above range, it may be advantageous for the in-plane retardation satisfying a specific range for each wavelength band.

The polymer film prepared by the preparation process as described above is excellent in optical properties and mechanical properties. The polymer film may be applicable to various uses that require durability and transparency. For example, the polymer film may be applied to solar cells, semiconductor devices, sensors, and the like, as well as display devices.

The details on the polymer film prepared by the process for preparing a polymer film are as described above.

Hereinafter, the above description will be described in detail by referring to examples. However, these examples are set forth to illustrate the present invention, and the scope of the present invention is not limited thereto.

EXAMPLE

Example 1

A glass reactor equipped with a temperature-controllable double jacket was charged with dimethylacetamide (DMAc) as an organic solvent at 20° C. under a nitrogen atmosphere. Then, 0.2 mole of 2,2'-bis(trifluoromethyl)-4,4'-diaminobiphenyl (TFMB) as an aromatic diamine was slowly added thereto and dissolved.

Subsequently, while 0.1 mole of 2,2'-bis(3,4-dicarboxyphenyl) hexafluoropropane dianhydride (6-FDA) as an aromatic dianhydride was slowly added thereto, the mixture was stirred for 1 hour. Next, 0.04 mole of terephthaloyl chloride (TPC) and 0.06 mole of 1,1'-biphenyl-4,4'-dicarbonyl dichloride (BPDC) as an aromatic dicarbonyl compound were added thereto, and the mixture was stirred for 1 hour to prepare a polymer resin composition.

Subsequently, the polymer resin composition was coated with a doctor blade on a carrier substrate. Then, it was thermally treated in an oven at 120° C. for 20 minutes. The sheet as coated on the film was stretched by 1.05 times in one direction at 330° C. through a stretcher and thermally treated for 20 minutes at the same temperature to prepare a film having a thickness of 50 μm.

Examples 2 to 6 and Comparative Examples 1 to 3

Films were prepared in the same manner as in Example 1, except that the types and number of moles of the dianhydride compound and the dicarbonyl compound, the stretching ratio, stretching/thermal treatment temperature, and film thickness were changed as shown in Table 1 below.

TABLE 1

| | Composition (Molar ratio) | TFMB (mole) | Stretching ratio (times) | Stretching/ thermal treatment temperature (° C.) |
|---|---|---|---|---|
| Ex. 1 | 6-FDA/BPDC/TPC 0.10/0.06/0.04 | 0.2 | 1.05 | 330 |
| Ex. 2 | 6-FDA/BPDC/TPC 0.06/0.08/0.06 | 0.2 | 1.2 | 330 |
| Ex. 3 | CBDA/BPDA/TPC 0.04/0.08/0.08 | 0.2 | 1.15 | 280 |
| Ex. 4 | CBDA/BPDA/TPC 0.1/0.04/0.06 | 0.2 | 1.10 | 280 |
| Ex. 5 | 6-FDA/IPC/TPC 0.05/0.06/0.09 | 0.2 | 1.01 | 300 |
| Ex. 6 | 6-FDA/IPC/TPC 0.02/0.05/0.13 | 0.2 | 1.15 | 300 |
| C. Ex. 1 | 6-FDA/IPC/TPC 0.05/0.06/0.09 | 0.2 | 2.5 | 300 |
| C. Ex. 2 | 6-FDA/BPDC/TPC 0.06/0.08/0.06 | 0.1 | Not stretched | 330 |
| C. Ex. 3 | CBDA/BPDA/TPC 0.1/0.04/0.06 | 0.2 | 2.1 | 300 |

6-FDA: 2,2'-bis(3,4-dicarboxyphenyl)hexafluoropropane dianhydride
BPDC: 1,1'-biphenyl-4,4'-dicarbonyl dichloride
TPC: terephthaloyl chloride
CBDA: cyclobutane-1,2,3,4-tetracarboxylic dianhydride
BPDA: 3,3',4,4'-biphenyltetracarboxylic dianhydride
IPC: isophthaloyl chloride
TFMB: 2,2'-bis(trifluoromethyl)benzidine Evaluation Example The films prepared in Examples 1 to 6 and Comparative Examples 1 to 3 were each measured and evaluated for the following properties. The results are shown in Tables 2 and 3 below.

Evaluation Example 1: Measurement of Film Thickness

The thickness was measured at 5 points in the transverse direction using a digital micrometer 547-401 manufactured by Mitutoyo Corporation. Their average value was adopted as the thickness.

Evaluation Example 2: Evaluation of in-Plane Retardation

The polymer films thus prepared were each cut to a square of 10 cm×10 cm in which each side thereof was parallel to the stretching direction and the direction perpendicular to the stretching direction to prepare a polymer film (or a sample for measurement). The in-plane retardation was measured with a retardation measuring device (Axoscan of Axometrics, measuring wavelength: 400 nm, 450 nm, 500 nm, 550 nm, 600 nm, 650 nm, 700 nm, 750 nm, and 800 nm). Table 2 shows the in-plane retardation (Ro, nm) of the polymer film measured with light in each wavelength band (nm). The in-plane retardations of the films according to Examples 1 to 6 and Comparative Examples 1 to 3 for each wavelength band were obtained therefrom and are graphically illustrated in FIGS. 1 to 9.

Evaluation Example 3: Measurement of Transmittance and Haze

The transmittance at 550 nm was measured using a haze meter NDH-5000W manufactured by Nippon Denshoku Kogyo.

Evaluation Example 4: Measurement of a Rainbow Phenomenon

Films according to Examples and Comparative Examples were prepared. One side of each film was subjected to hard-coating treatment, and the other side was treated to black. It was observed with the naked eyes whether a rainbow phenomenon occurred at the extreme angles. The visual evaluation was carried out under a three-wavelength lamp in a dark room. The evaluation criteria are as follows:

Good: Rainbow phenomenon was not observed in a uniform color
Intermediate: Rainbow phenomenon was slightly observed in a uniform color
Poor: Rainbow phenomenon was strongly observed in a strong color Evaluation Example 5: Measurement of Glossiness The films according to Examples and Comparative Examples were measured for the glossiness using BYK (AG-4563). In such event, three samples were measured for each reflector, and the average value was calculated as the glossiness (60°) of the reflector.

TABLE 2

| Wavelength (nm) | 400 | 450 | 500 | 550 | 600 | 650 | 700 | 750 | 800 |
|---|---|---|---|---|---|---|---|---|---|
| Ex. 1 | 53 | 49 | 45 | 42 | 40 | 39 | 37 | 36 | 34 |
| Ex. 2 | 321 | 301 | 279 | 251 | 225 | 210 | 198 | 189 | 181 |
| Ex. 3 | 195 | 178 | 165 | 154 | 145 | 140 | 134 | 130 | 126 |
| Ex. 4 | 120 | 100 | 95 | 88 | 84 | 81 | 76 | 73 | 71 |
| Ex. 5 | 43 | 40 | 37 | 35 | 34 | 34 | 33 | 32 | 31 |
| Ex. 6 | 158 | 144 | 132 | 125 | 123 | 122 | 118 | 115 | 112 |
| C. Ex. 1 | 525 | 479 | 392 | 330 | 324 | 313 | 306 | 300 | 292 |
| C. Ex. 2 | 181 | 166 | 150 | 130 | 133 | 135 | 130 | 121 | 113 |
| C. Ex. 3 | 475 | 423 | 330 | 280 | 271 | 266 | 251 | 242 | 235 |

TABLE 3

| | T* | A | G | Optical characteristics | | | G* | Ra ($R_{450}$/ $R_{550}$) | Rb ($R_{650}$/ $R_{550}$) | RS ($R_a \times R_b$) |
|---|---|---|---|---|---|---|---|---|---|---|
| | (nm) | | (nm) | TT | Hz | R* | (GU) | | | |
| Ex. 1 | 50 | −0.0475 | 3.9 | 89.5 | 0.50 | Good | 92 | 1.167 | 0.929 | 1.083 |
| Ex. 2 | 51 | −0.35 | 17.5 | 90.1 | 0.43 | Good | 95 | 1.199 | 0.837 | 1.003 |
| Ex. 3 | 40 | −0.1725 | 15.1 | 88.9 | 0.59 | Good | 105 | 1.156 | 0.909 | 1.051 |
| Ex. 4 | 30 | −0.1225 | 13.6 | 90.2 | 0.53 | Good | 102 | 1.136 | 0.920 | 1.045 |
| Ex. 5 | 50 | −0.03 | 3.5 | 89.8 | 0.41 | Good | 115 | 1.143 | 0.971 | 1.110 |
| Ex. 6 | 50 | −0.115 | 15.8 | 90.5 | 0.38 | Good | 103 | 1.152 | 0.976 | 1.124 |
| C. Ex. 1 | 40 | −0.5825 | 107.6 | 90.1 | 0.6 | Poor | 78 | 1.452 | 0.948 | 1.376 |
| C. Ex. 2 | 50 | −0.17 | 25.5 | 88.5 | 0.65 | Poor | 125 | 1.277 | 1.038 | 1.326 |
| C. Ex. 3 | 45 | −0.6 | 105 | 90.2 | 0.42 | Poor | 85 | 1.511 | 0.950 | 1.435 |

*T: thickness, R: rainbow, G: glossiness

In Table 2 above, the in-plane retardations (nm) of the Examples and the Comparative Examples were obtained in each measurement wavelength band.

In Table 3 above, A was calculated according to Equation 1 under the conditions that λ1 was about 400 nm, and λ2 was about 800 nm. In addition, in Table 3 above, G was calculated according to Equation 2 under the conditions that λ1 was about 400 nm, λ2 was about 800 nm, and λ3 was about 550 nm.

As can be seen from Tables 2 and 3, in the polymer films of Examples 1 to 6 according to the embodiment, the A value according to Equation 1 and the G value satisfied a certain level in the visible light region. They were excellent in optical properties such as transmittance and haze, rainbow phenomenon, and glossiness as compared with Comparative Examples 1 to 3.

Specifically, in the polymer films of Examples 1 to 6 according to the embodiment, the A value according to Equation 1 was −0.5 or more and the haze was 0.6% or less, whereas the A value was less than −0.5 in Comparative Examples 1 and 3, and the haze was as high as 0.65% in Comparative Example 2.

In addition, as the A value and the G value satisfied the above ranges in the polymer films of Examples 1 to 6 according to the embodiment, the in-plane retardations were within a specific range for each wavelength band, resulting in no rainbow phenomenon. They had a glossiness of 90 GU to 115 GU, showing an aesthetic feeling similar to that of glass.

In contrast, in the polymer films of Comparative Examples 1 to 3, a rainbow phenomenon was strongly observed in strong color. The polymer films of Comparative Examples 1 and 3 had a very low glossiness of 85 GU or less. The polymer film of Comparative Example 2 had an excessively high glossiness of 125 GU.

In addition, the polymer films of Examples 1 to 6 had an Ra value of 1.0 to 1.4 and an Rb value of 0.7 to 1.0, showing the feature that the retardation decreases as the wavelength increases in the visible region. In contrast, the polymer films of Comparative Examples 1 and 3 had an Ra value that exceeded the above range, and the polymer film of Comparative Example 2 had an Rb value that exceeded the range of the present invention.

Thus, the polymer film according to an embodiment has an in-plane retardation within a specific range for each wavelength band in the visible light region, which is effective in preventing reflection in a wide viewing angle. It shows an aesthetic feeling similar to that of glass and remarkably reduces the rainbow phenomenon.

REFERENCE NUMERALS OF THE DRAWINGS

100: polymer film
101: first side
102: second side
200: functional layer
300: cover window
400: display unit
500: adhesive layer

The invention claimed is:
1. A polymer film, which comprises at least one polymer resin selected from the group consisting of a polyamide-based resin, a polyimide-based resin, and a polyamide-imide-based resin, which has a glossiness of 90 GU to 120 GU,
wherein the polymer film has a haze of 0.6% or less and an in-plane retardation deviation ratio (A) represented by the following Equation 1 of −0.5 or more, and

R1 in the following Equation 1 is 1,000 nm or less:

$$A=(R2-R1)/(\lambda 2-\lambda 1)$$ [Equation 1]

in the above, $\lambda 1$ is 400 nm, $\lambda 2$ is 800 nm, R1 is the in-plane retardation of the polymer film measured with light having a wavelength of $\lambda 1$, and R2 is the in-plane retardation of the polymer film measured with light having a wavelength of $\lambda 2$.

2. The polymer film of claim 1, wherein A is −0.4 or more, R1 is 400 nm or less, and R2 is 300 nm or less.

3. The polymer film of claim 1, wherein R1 is larger than R2.

4. The polymer film of claim 1, which has an in-plane retardation deviation gap (G) represented by the following Equation 2 of 100 nm or less:

$$G=|R3-\{R1+A(\lambda 3-\lambda 1)\}|$$ [Equation 2]

in the above, $\lambda 3$ is 550 nm, and R3 is the in-plane retardation of the polymer film measured with light having a wavelength of $\lambda 3$.

5. The polymer film of claim 1, which comprises the at least one polymer resin selected from the group consisting of a polyamide-based resin, a polyimide-based resin, and a polyamide-imide-based resin in an amount of 90% by weight or more based on the total weight of the polymer film.

6. The polymer film of claim 1, which has a light transmittance at a wavelength of 550 nm of 80% or more, a yellow index of 3 or less, and a thickness of 30 μm to 100 μm.

7. The polymer film of claim 1, which has a refractive index of 1.6 to 1.7.

8. The polymer film of claim 1, which has an Ra represented by the following Equation 5 of 1.0 to 1.4 and an Rb represented by the following Equation 6 of 0.7 to 1.0:

$$Ra=R_{450}/R_{550}$$ [Equation 5]

$$Rb=R_{650}/R_{550}$$ [Equation 6]

in the above, $R_{450}$, $R_{550}$, and $R_{650}$ are the in-plane retardations of the polymer film measured with light having a wavelength of 450 nm, 550 nm, and 650 nm, respectively.

9. A process for preparing the polymer film of claim 1, which comprises:

forming an unstretched sheet from at least one polymer resin selected from the group consisting of a polyamide-based resin, a polyimide-based resin, and a polyamide-imide-based resin;

stretching the unstretched sheet at a stretching ratio of 1.01 to 1.5 in the MD direction or the TD direction; and heat setting the stretched sheet.

10. The process of claim 9 for preparing the polymer film, wherein the stretching is carried out at a stretching temperature higher or lower than the glass transition temperature (Tg) of the polymer resin by 5° C. to 20° C.

\* \* \* \* \*